United States Patent Office 2,776,378
Patented Jan. 1, 1957

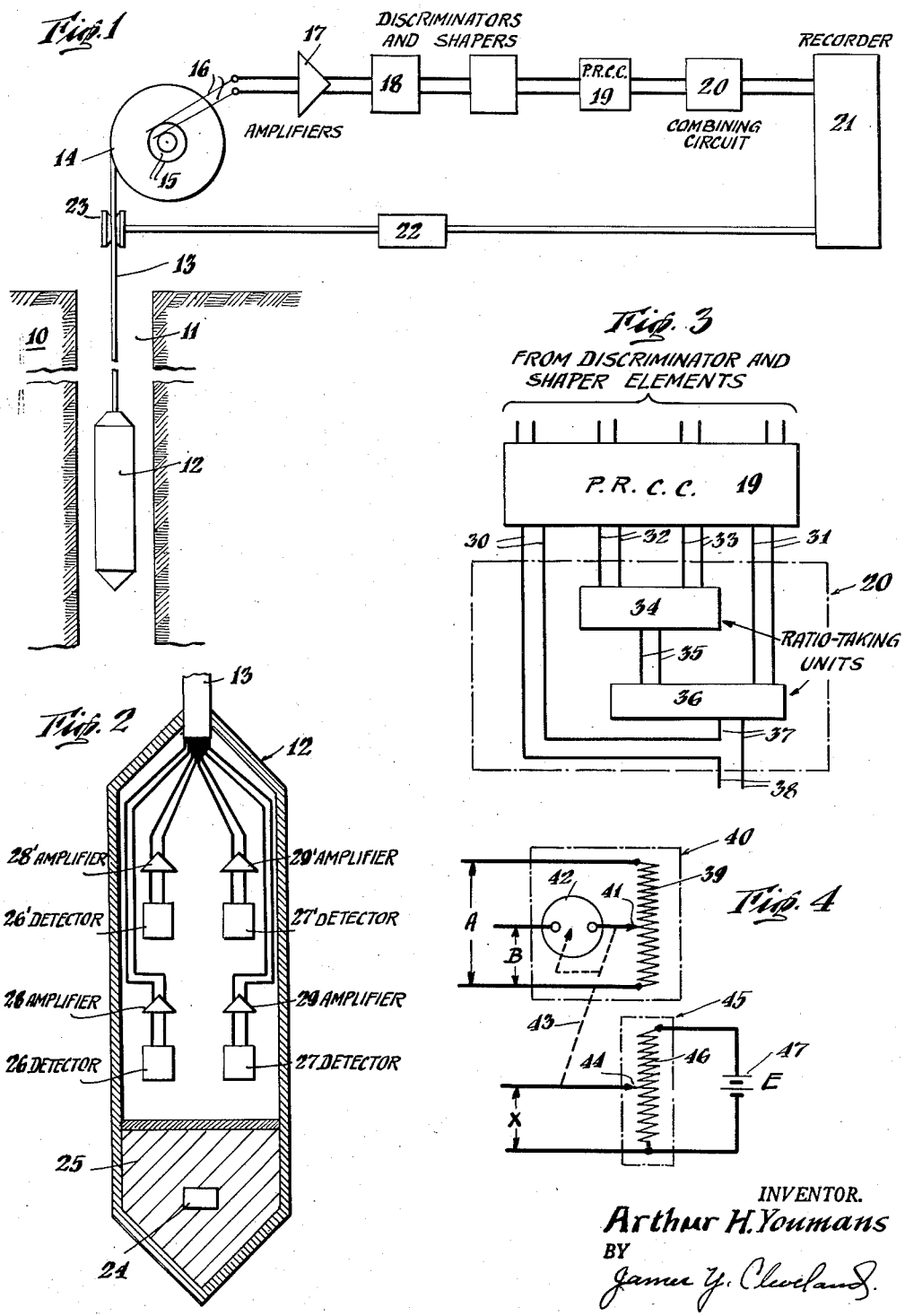

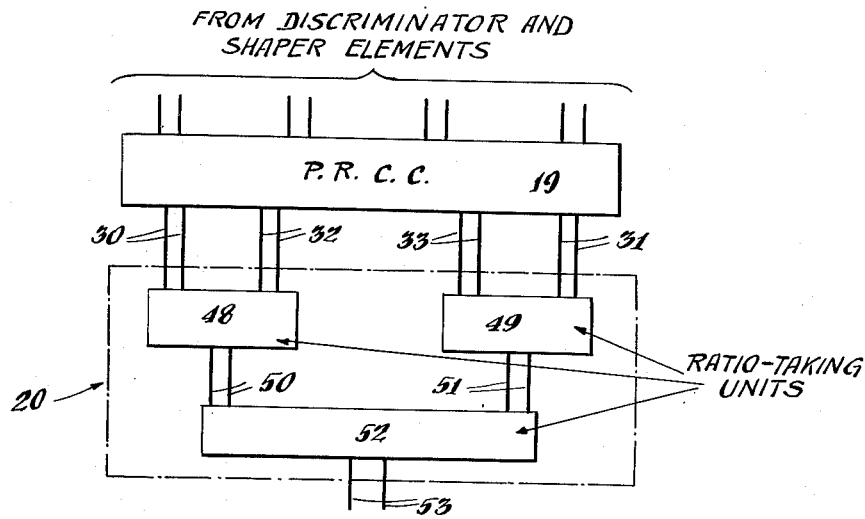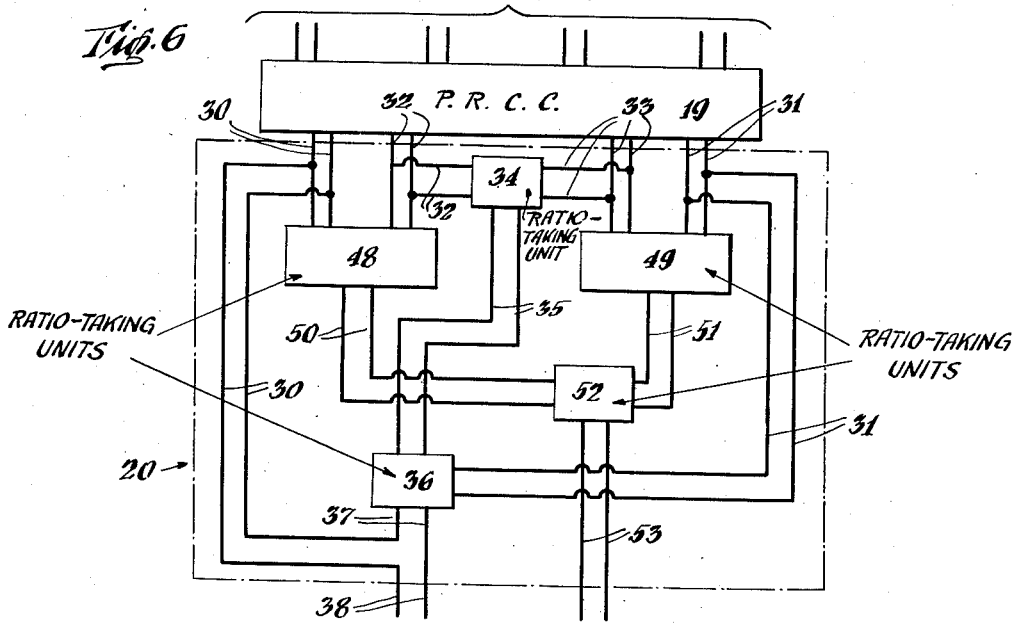

2,776,378

METHOD AND APPARATUS FOR RADIO-ACTIVITY WELL-LOGGING

Arthur H. Youmans, Tulsa, Okla., assignor to Well Surveys, Incorporated, Tulsa, Okla., a corporation of Delaware Application January 26, 1951, Serial No. 208,019

11 Claims. (Cl. 250—83.6)

This invention relates to the art of geophysical prospecting and more particularly to the art of radioactivity well-logging wherein gamma rays resulting from the inelastic scattering of neutrons are measured.

Every nucleus except protium and helium appears to have excitation energy levels which may at least in principle be excited by neutrons from available neutron sources such as a radium beryllium neutron source. This excitation arises when fast neutrons collide with nuclei without being captured but with a net loss in kinetic energy of the system and consequent degradation of neutrons' energy. This lost kinetic energy is absorbed by the struck nucleus with the result that it is left in a so-called excited state from which state it in general immediately returns to the normal or ground state with the emission of one or more gamma ray photons whose total energy is equal to the energy lost in the collision.

Each of these energy levels is characteristic of the nucleus in question, both with respect to the magnitude of the energy involved and the probability with which it may be expected to occur. Hence, a precise spectrographic analysis of the gamma rays resulting from this process would give definite information as to the elements involved and would permit identification of the material in the strata surrounding the drill hole. Such analysis is difficult because the bombarding neutrons are always ultimately captured and one or more gamma rays invariably arises from this process; thus, the photons resulting from inelastic collisions will tend to be obscured by photons from other sources.

This invention is a method and apparatus for observing the gamma rays arising from the inelastic scattering processes in the presence of gamma rays from other sources by appropriately combining the simultaneous measurements of both slow neutron flux and gamma ray flux at two different points, appropriately spaced from each other and from a source of fast neutrons.

Therefore, the primary object of this invention is to provide a method and apparatus for identifying the elements in the strata surrounding a drill hole.

Another object is to provide a method and apparatus for observing gamma rays arising from the inelastic scattering of neutrons.

Another object is to provide a method and apparatus for observing gamma rays arising from inelastic scattering processes in the presence of other gamma rays by appropriately combining the simultaneous measurements of both slow neutron flux and gamma ray flux at two different points, appropriately spaced from each other and from a source of fast neutrons.

Still another object is to provide a method and apparatus for observing gamma rays arising from inelastic scattering processes while removing error due to other gamma rays.

A further object is to provide a method and apparatus for observing gamma rays arising from inelastic scattering processes while compensating for the effect of hydrogen in the strata and/or the effect of variations in the average capture cross section of the material in the strata.

Other objects and advantages of the present invention will become apparent from the following detailed description when considered with the accompanying drawings, in which:

Figure 1 is a diagrammatic illustration of a radioactivity well-logging operation in which the instant invention is employed;

Figure 2 is a schematic illustration of an enlarged vertical sectional view of the subsurface instrument;

Figure 3 is a schematic diagram of one form of the combining circuit of the surface instrument;

Figure 4 is a schematic diagram of the ratio-talking units in the combining circuit of Figure 3;

Figure 5 is a schematic diagram of a modified form of the combining circuit of the surface instrument; and Figure 6 is a schematic diagram of another form of the combining circuit which combines the forms illustrated schematically in Figures 3 and 5.

Referring to the drawings in detail, particularly Figure 1, there is illustrated a radioactivity well-surveying operation in which a portion of the earth's surface 10 is shown in vertical section. A well 11 penetrates the earth's surface and may or may not be cased. Disposed within the well is subsurface instrument 12 of the well-logging system. Cable 13 suspends the instrument in the well and contains the required conductors for electrically connecting the instrument with the surface apparatus. The cable is wound on or unwound from drum 14 in raising and lowering instrument 12 to traverse the well. Through sliprings 15 and brushes 16 on the end of the drum, the conductors in the cable are electrically connected to amplifiers 17, which are in turn connected through pulse height discriminators 18 and pulse rate conversion circuits 19 to combining circuit 20; combining circuit 20 is connected to recorder 21, which is driven through a transmission 22 by measuring reel 23 over which cable 13 is drawn so that recorder 21 moves in correlation with depth as instrument 12 traverses the well. Although in Figure 1 a single channel from the drum to the recorder is shown, it is obvious that as many channels as are necessary for a particular operation will be used. It is to be understood that power for the above mentioned apparatus shown schematically is to be furnished in a conventional manner by power supplies not shown.

As shown in Figure 2, the subsurface instrument 12 comprises a neutron source 24 appropriately shielded by shielding material 25 and at suitable distances from the source gamma ray detectors 26 and 26' and slow neutron detectors 27 and 27' with associated amplifiers 28, 28', 29, and 29'. The elements are shown diagrammatically, and it is to be understood that the necessary associated circuit and power supplies are supplied in a conventional manner. It is also to be understood that the instrument housing will be constructed to withstand the pressures and mechanical and thermal abuses encountered in logging a deep bore hole and yet provide adequate space within it to house the necessary apparatus and permit the transmission of radiation through it.

Detectors 26 and 27 detect gamma rays and slow neutrons respectively at substantially the same point or at points of equal radiation density near the neutron source 24. These detectors may be entirely separate from each other or they may comprise a composite detector. An example of the former would be a coaxial Geiger counter and boron trifluoride ionization chamber or proportional counter. An example of the latter would be an ionization chamber filled with a mixture of boron trifluoride and argon and operated as a proportional counter, the associated electonic circuit being equipped with an appropriate pulse sorter or discriminator to separate the two different processes according to the pulse size. It is obvious that when the detector is an ionization chamber that the discriminator and pulse rate conversion circuits may be eliminated. Detectors 26' and 27' detect gamma rays and neutrons respectively at a common point or at points where the radiation fluxes are substantially equal. Detectors 26' and 27' are more distant from neutron source 24 than detectors 26 and 27 but are otherwise the same as detectors 26 and 27.

Source 24 bombards the strata near the drill hole with high energy neutrons. Some of these neutrons are captured by the nuclei of the atoms making up the formations around the drill hole. Others of these neutrons are scattered by nuclei without being captured. Some of these scattered neutrons reach detector 27 or detector 27' and give rise to pulses. The capture of neutrons results in the emission by the capturing nucleus of gamma rays which may be detected by detectors 26 and 26'. The scattering of neutrons may be elastic or inelastic, inelastic scattering giving rise to gamma rays which also may be detected by detectors 26 and 26'. As neutrons are scattered, they lose energy and are then more likely to be captured. At a distance from the neutron source, most of the neutrons have been substantially reduced in energy, and there is very little inelastic scattering; in fact, with sufficiently low energies inelastic scattering is impossible. Detector 26 is near the neutron source 24 and consequently detects capture process gamma rays as well as scattering process gamma rays; however, detector 26' is positioned so far from source 24 that very little scattering process gamma rays are detected, but mostly capture process gamma rays.

Gamma ray flux at the points near the source and remote from the source may be designated as $g$ and $g'$, respectively, and are detected by detectors 26 and 26', respectively. The corresponding slow neutron fluxes may be designated as $N$ and $N'$ and are detected by detectors 27 and 27', respectively. Gamma ray flux $g'$ will be, as explained above, due substantially only to capture processes, but $g$ is due to the sum of capture process gamma ray flux $g_c$ and scattering process gamma ray flux $g_s$. The flux of gamma rays due to the capture processes are in a given medium proportional to neutron flux; hence, $g_c$ may be expressed as function of measurable parameters:

$$g_c = g' \, N/N' \quad (1)$$

and consequently:

$$g_s = g - g' \, N/N' \quad (2)$$

To record scattering process gamma ray flux as a function of depth in the drill hole, the pulses from detectors 26, 26', 27, and 27' are respectively amplified by amplifiers 28, 28', 29, and 29' and sent via cable 13 to the surface where they may be further amplified by amplifiers 17. Discriminators 18 reject unwanted signals. Discriminators 18 include shapers to shape the pulses in the signals so that all pulses of any signal are of the same shape; this is necessary in order that each pulse may have the same effect as any other on pulse rate conversion circuits 19 which convert the pulses into direct current voltages proportional to $g$, $g'$, $N$, and $N'$, respectively. These voltages are combined in combining circuit 20, and a voltage proportional to scattering process gamma ray flux $g_s$ is recorded on recorder 21 as a function of depth.

As is shown in Figure 3, combining circuit 20 takes the ratio and difference of voltages to give a voltage proportional to scattering process gamma ray flux $g_s$. Signal pulses are supplied to pulse rate conversion circuits 19 by as many channels as required from discriminator and shaping elements 18. Pulse rate conversion circuits 19 provide voltages proportional to $g$, $g'$, $N$, and $N'$ on conductor leads 30, 31, 32, and 33, respectively. Voltages proportional to $N$ and $N'$ are applied through conductors 32 and 33, respectively, to ratio-taking unit 34 which gives an output voltage proportional to their ratio $N'/N$. This voltage and a voltage proportional to $g'$ are applied through conductors 35 and 31, respectively, to a second ratio-taking unit 36 which gives an output voltage proportional to their ratio $g'N/N'$. This voltage is made to oppose a voltage proportional to $g$ through conductors 37 and 30, respectively, yielding a voltage equal to the difference of the two voltages and proportional to $g_s$ which is applied to the recorder through conductors 38.

The operation of ratio taking units 34 and 36 is shown in Figure 4. The larger of two direct current voltages A is applied across resistor 39 of a self-balancing potentiometer 40, and the smaller of the two voltages B is applied with proper polarity from one end of resistor 39 to the sliding contact 41 of potentiometer 40 through galvanometer 42 of potentiometer 40. A conventional self-balancing potentiometer is constructed so that sliding contact 41 is moved to the position on resistor 39 where there is no current in galvanometer 42. At this position the potentiometer is balanced, and the ratio of that part of resistor 39 across which voltage B is applied to the entire resistor 39 across which voltage A is applied is equal to the ratio of the respective voltages. Sliding contact 41 is connected by mechanical linkage 43 to the sliding contact 44 of a second potentiometer 45 so that resistor 46 of potentiometer 45 is divided in the same proportion as resistor 39 of potentiometer 40. If a constant voltage E is applied from source 47 across resistor 46, voltage $x$ across the proper part of resistor 46 will bear the same ratio to constant voltage E as voltage B does to voltage A. Since voltage E is constant, output voltage $x$ is directly proportional to B/A. The proportionality constant is the voltage E of source 47. The voltage E of source 47 must be adjusted in ratio taking units 34 and 36 so that the overall proportional constant is unity, thereby giving the output of unit 36 the same proportionality factor as $g$ and permitting direct subtraction of these two voltages to indicate $g_s$, scattering process gamma ray flux. It is clear from the description in conjunction with Figure 4 that voltage A must be greater than voltage B in order for potentiometer 40 to balance. In the event that the voltage which is to be the denominator of the ratio, i. e., the voltage A to be applied across resistor 39, is smaller than the other voltage, the numerator, that other voltage must be reduced by a known factor before being applied to the potentiometer 40. This may be done by the conventional Ayrton shunt.

An indication of scattering process gamma ray flux $g_s$ may be alternatively obtained as shown in Figure 5. Voltages proportional to $g$ and $N$ are applied through conductors 30 and 32, respectively, to ratio-taking unit 48 to yield a voltage proportional to their ratio $N/g$. Likewise the ratio $N'/g'$ is taken by applying voltages proportional to $g'$ and $N'$ through conductors 31 and 33, respectively, to ratio-taking unit 49. The outputs of ratio-taking units 48 and 49 are applied through conductors 50 and 51, respectively, to ratio-taking unit 52 the output of which is a voltage proportional to the ratio of these two ratios $Ng'/N'g$. This voltage is applied through conductors 53 to the recorder. This ratio compares the ratio of neutron flux to gamma ray flux at the two points, and since gamma rays arising from inelastic scattering make smaller the ratio of neutron flux to gamma ray flux at the point near the source, it will serve as an indication of inelastic scattering. Both methods may be combined for simultaneous operation, as shown by Figure 6.

A log obtained by the practice of this invention will indicate different characteristics of the strata than do other types of logs and will accordingly have utility. The interpretation of the log will be complicated by the fact that the number of gamma rays produced by inelastic scattering will be influenced not only by the relative abundance of the elements which favor this process but also by the elastic scattering property of the medium. This latter property depends largely upon the hydrogen content of the material; in a fluid-rich material as compared to a fluid-poor material a neutron will suffer fewer collisions with nuclei other than hydrogen before its energy falls below the threshold for inelastic scattering. Thus, if the instrument were surrounded by oil or water, it would indicate a minimum. This dependence upon hydrogen content will not destroy the utility of the log unless it completely obscures the other characteristics; and in any event, the effect of hydrogen content may be compensated for, since this invention provides an independent measure of hydrogen content. The ratio of neutron flux at the two points depends upon the scattering properties of the medium, hence upon hydrogen content; this ratio $N'/N$ is available on conductors 35 as the output of ratio-taking unit 34 and may be combined by another ratio-taking unit with the measured value of $g_s$ to compensate for hydrogen content and yield a log independent of hydrogen content.

The log may also be affected to some extent by variations in the average capture cross section of the formation material. Ratio $N'/g'$ depends principally upon the average probability of neutron capture and may be introduced to compensate for dependence upon absorption. This ratio is available on conductors 51 as the output of ratio taking unit 49.

This invention is primarily useful in the measurement of scattering process gamma rays $g_s$. However, as shown in Figure 6, voltages are available to make several other useful logs simultaneously:

1. Slow neutron flux density, N or N' (voltages on conductors 32 or 33, respectively);
2. Gamma ray flux density due to neutron capture, $g'$ (voltage on conductors 31);
3. Average absorption cross section of the strata for slow neutrons, $N'/g'$ (voltage on conductors 51);
4. Hydrogen content of the strata as reflected in the elastic scattering properties of the strata $N/N'$ (voltage on conductors 35).

Each of these logs may be automatically compensated or corrected for inherent dependence upon one or more of the other quantities whenever the degree of dependence has been empirically established.

It is to be understood that this invention is not to be limited to the specific modifications described but is to be limited only by the following claims.

I claim:

1. A method of radioactivity well-logging that comprises the steps of traversing the formations penetrated by the well with a source of neutrons to thereby irradiate the formations with neutrons, simultaneously and by the same traversing step separately detecting slow neutrons and gamma rays at points substantially equidistant from the neutron source by producing systematically related electrical signals, simultaneously and by the same traversing step separately detecting gamma radiation and slow neutrons at points that are substantially equidistant from the neutron source and vertically spaced from the first recited detection points by producing systematically related electrical signals, and independently receiving said signals and deriving therefrom a signal that is systematically related to the intensity of the gamma rays of inelastic scattering of neutrons in the formations adjacent said first mentioned points of detection.

2. A method of radioactivity well-logging that comprises the steps of traversing the formations penetrated by the well with a source of neutrons to thereby irradiate the formations with neutrons, simultaneously and by the same traversing step separately detecting slow neutrons and gamma rays at points substantially equidistant from the neutron source by producing proportionally related electrical signals, simultaneously and by the same traversing step separately detecting gamma radiation and slow neutrons at points that are substantially equidistant from the neutron source and vertically spaced from the first recited detection points by producing proportionally related electrical signals, electrically producing signals proportional to the ratio of the signals corresponding to the neutrons detected at the remote point to the signals corresponding to the neutrons detected at the near point, electrically producing signals proportional to the ratio of the signals corresponding to the gamma radiation detected at the remote point to the signals corresponding to the first recited ratio, electrically subtracting the signals corresponding to the second ratio from the signals corresponding to the gamma radiation detected at the near point to thereby produce signals proportionally related to the gamma radiation produced by inelastic neutron scattering in the formations, and recording this result in correlation with the depth in the well at which detection occurred.

3. A method of radioactivity well-logging that comprises the steps of traversing the formations penetrated by the well with a source of neutrons to thereby irradiate the formations with neutrons, simultaneously and by the same traversing step detecting gamma radiation and slow neutrons at at least two points vertically spaced and at different distances from the neutron source by producing proportionally related electrical signals, transmitting the signals to the surface of the earth, electrically deriving from said signals a signal corresponding to a ratio of the product of the neutrons detected at the near point and the gamma radiation detected at the remote point to the product of the neutron flux detected at the remote point and gamma radiation detected at the near point as an index of gamma radiation resulting from inelastic scattering of neutrons in the formations, and recording this derived signal in correlation with the depth in the drill hole at which detection occurred.

4. A method of radioactivity well-logging that comprises the steps of traversing the formations penetrated by the well with a source of neutrons to thereby irradiate the formations with neutrons; simultaneously and by the same traversing step detecting gamma radiation and slow neutrons at at least two points vertically spaced and at different distances from the neutron source by producing proportionally related electrical signals; transmitting the signals to the surface of the earth; electrically deriving from said signals independent signals corresponding to detected slow neutron flux, a ratio of the detected slow neutron flux to the detected gamma radiation produced by neutron capture, detected gamma radiation produced by neutron capture, a ratio of the neutron flux detected at the near point to that detected at the remote point, and gamma radiation resulting from inelastic scattering of neutrons in the formations; and separately recording these derived signals in correlation with the depth in the well at which detection occurred.

5. A method of radioactivity well-logging that comprises the steps of traversing the formations penetrated by the well with a source of neutrons to thereby irradiate the formations with neutrons; simultaneously and by the same traversing step detecting gamma radiation and slow neutrons at at least two points vertically spaced and at different distances from the neutron source by producing proportionally related electrical signals; transmitting the signals to the surface of the earth; electrically deriving from said signals independent signals corresponding to detected slow neutron flux, a ratio of the detected slow neutron flux to the detected gamma radiation produced by neutron capture, detected gamma radiation produced by neutron capture, a ratio of the neutron flux detected at the near point to that detected at the remote point, and gamma radiation resulting from inelastic scattering of neutrons in the formations; and recording the derived signal corresponding to the gamma radiation resulting from inelastic scattering of neutrons in the formations and at least one other of these derived signals in correlation with the depth in the well at which detection occurred.

6. A method of radioactivity well-logging that comprises the steps of traversing the formations penetrated by the well with a source of neutrons to thereby irradiate the formations with neutrons; simultaneously and by the same traversing step detecting gamma radiation and slow neutrons at at least two points vertically spaced and at different distances from the neutron source by producing proportionally related electrical signals; transmitting the signals to the surface of the earth; electrically deriving from said signals independent signals corresponding to detected slow neutron flux, a ratio of the detected slow neutron flux to the detected gamma radiation produced by neutron capture, detected gamma radiation produced by neutron capture, a ratio of the neutron flux detected at the near point to that detected at the remote point, and gamma radiation resulting from inelastic scattering of neutrons in the formations; utilizing at least one of said derived signals to vary at least one other of said derived signals to compensate for dependence of the physical quantity corresponding to one derived signal upon the physical quantity corresponding to the other derived signal; and recording at least one of these derived signals in correlation with the depth in the well at which detection occurred.

7. Apparatus for logging wells comprising an instrument housing adapted to be lowered and raised in a well, a source of neutrons within said housing, a plurality of pairs of detectors also disposed within said housing but each pair being differently spaced from said source of neutrons, each of said pairs of detectors consisting of a gamma radiation detector and a neutron detector, means for transmitting detection signals from said gamma radiation and neutron detectors to the surface of the earth, means at the surface for independently receiving said signals and deriving therefrom a signal that is systematically related to the intensity of the gamma rays of inelastic scattering of neutrons in the formations adjacent the point of detection, and means for recording the derived signal in correlation with depth in the well at which detection occurred.

8. A method of radioactivity well logging that comprises the steps of traversing the formations penetrated by the well with a source of neutrons to thereby irradiate the formations with neutrons, simultaneously and by the same traversing step separately detecting slow neutrons and gamma rays at points substantially equidistant from the neutron source by producing proportionally related electrical signals, simultaneously and by the same traversing step separately detecting gamma radiation and slow neutrons at points that are substantially equidistant from the neutron source and vertically spaced from the first recited detection points by producing proportionally related electrical signals, electrically producing signals proportional to the ratio of the product of the signals corresponding to the neutrons detected at the near point and the gamma rays detected at the remote point to the signals corresponding to the neutrons detected at the remote point, electrically subtracting the signals corresponding to said ratio from the signals corresponding to the gamma radiation detected at the near point to thereby produce signals proportionally related to the gamma radiation produced by inelastic neutron scattering in the formations, and recording this result in correlation with the depth in the well at which detection occurred.

9. Apparatus for logging wells comprising an instrument housing adapted to be lowered and raised in a well, a source of neutrons within said housing, a first gamma ray detecting means within said housing, a first slow neutron detecting means also within said housing at substantially the same distance from said source of neutrons as said first gamma ray detecting means, a second gamma ray detecting means also within said housing more distant than said first gamma ray detecting means from said source of neutrons, a second slow neutron detecting means at substantially the same distance from said source of neutrons as said second gamma ray detecting means, a first ratio-taking unit, means for transmitting the detection signals from said first and second slow neutron detecting means to said first ratio-taking unit whereby there is derived a first derived signal equal to the ratio of the detection signal from said second slow neutron detecting means to the detection signal from said first slow neutron detecting means, a second ratio-taking unit, means for transmitting the detection signal from said second gamma ray detecting means and said first derived signal to said second ratio-taking unit whereby there is derived a second derived signal equal to the ratio of the detection signal from said second gamma ray detecting means to said first derived signal, means for subtracting said second derived signal from the detection signal from said first gamma ray detecting means whereby there is derived a third derived signal proportional to the intensity of the gamma rays of inelastic scattering of neutrons in the formations adjacent the well at the point of detection, and means for recording said third derived signal in correlation with the depth in the well at which detection occurred.

10. Apparatus for logging wells comprising an instrument housing adapted to be lowered and raised in a well, a source of neutrons within said housing, a first gamma ray detecting means within said housing, a first slow neutron detecting means also within said housing at substantially the same distance from said source of neutrons as said first gamma ray detecting means, a second gamma ray detecting means also within said housing more distant than said first gamma ray detecting means from said source of neutrons, a second slow neutron detecting means at substantially the same distance from said source of neutrons as said second gamma ray detecting means, a first ratio-taking unit, means for transmitting the detection signals from said first and second slow neutron detecting means to said first ratio-taking unit whereby there is derived a first derived signal equal to the ratio of the detection signal from said second slow neutron detecting means to the detection signal from said first slow neutron detecting means, a second ratio-taking unit, means for transmitting the detection signal from said first and second gamma ray detecting means to said second ratio-taking unit whereby there is derived a second derived signal equal to the ratio of the detection signal from said second gamma ray detecting means to the detection signal from said first gamma ray detecting means, a third ratio-taking unit, means for transmitting said first and second derived signals to said third ratio-taking unit whereby there is derived a third derived signal functionally related to the intensity of the gamma rays of inelastic scattering of neutrons in the formations adjacent the well at the point of detection, and means for recording said third derived signal in correlation with the depth in the well at which detection occurred.

11. Apparatus for logging wells comprising an instrument housing adapted to be lowered and raised in a well, a source of neutrons within said housing, a first gamma ray detecting means within said housing, a first slow neutron detecting means also within said housing at substantially the same distance from said source of neutrons as said first gamma ray detecting means, a second gamma ray detecting means also within said housing more distant than said first gamma ray detecting means from said source of neutrons, a second slow neutron detecting means at substantially the same distance from said source of neutrons as said second gamma ray detecting means, a first ratio-taking unit, means for transmitting the detection signals from said first and second slow neutron detecting means to said first ratio-taking unit whereby there is derived a first derived signal equal to the ratio of the detection signal from said second slow neutron detecting means to the detection signal from said first slow neutron detecting means, a second ratio-taking unit, means for transmitting the detection signal from said second gamma ray detecting means and said first derived signal to said second ratio-taking unit whereby there is derived a second derived signal equal to the ratio of the detection signal from said second gamma ray detecting means to said first derived signal, means for subtracting said second derived signal from the detection signal from said first gamma ray detecting means whereby there is derived a third derived signal proportional to the intensity of the gamma rays of inelastic scattering of neutrons in the formations adjacent the well at the point of detection, and means for recording a plurality of said detection and derived signals in correlation with the depth in the well at which detection occurred.

References Cited in the file of this patent

UNITED STATES PATENTS

| | | |
|---|---|---|
| 2,220,509 | Brons | Nov. 5, 1940 |
| 2,345,119 | Hare | Mar. 28, 1944 |
| 2,390,433 | Fearon | Dec. 4, 1945 |
| 2,462,995 | Ritzmann | Mar. 1, 1949 |
| 2,469,463 | Russell | May 10, 1949 |
| 2,481,014 | Herzog | Sept. 6, 1949 |
| 2,508,772 | Pontecorvo | May 23, 1950 |
| 2,543,676 | Thayer et al. | Feb. 27, 1951 |